United States Patent
Jeon et al.

(10) Patent No.: US 12,492,276 B2
(45) Date of Patent: Dec. 9, 2025

(54) METHOD OF PREPARING GRAFT COPOLYMER AND GRAFT COPOLYMER PREPARED BY THE SAME

(71) Applicant: LG CHEM, LTD., Seoul (KR)

(72) Inventors: Tae Young Jeon, Daejeon (KR); Joo Byung Chai, Daejeon (KR); Yu Sung Jung, Daejeon (KR); Jong Beom Kim, Daejeon (KR); In Seok Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 906 days.

(21) Appl. No.: 17/769,817

(22) PCT Filed: Jul. 6, 2021

(86) PCT No.: PCT/KR2021/008557
§ 371 (c)(1),
(2) Date: Apr. 18, 2022

(87) PCT Pub. No.: WO2022/010222
PCT Pub. Date: Jan. 13, 2022

(65) Prior Publication Data
US 2022/0380507 A1    Dec. 1, 2022

(30) Foreign Application Priority Data

Jul. 8, 2020    (KR) .................. 10-2020-0084052
Jul. 5, 2021    (KR) .................. 10-2021-0087924

(51) Int. Cl.
*C08F 279/04*    (2006.01)
*C08L 25/12*    (2006.01)
(52) U.S. Cl.
CPC ............ *C08F 279/04* (2013.01); *C08L 25/12* (2013.01)
(58) Field of Classification Search
CPC .. C08F 279/04; C08F 2/38; C08F 2/01; C08F 212/08; C08F 220/44; C08L 25/12; C08L 55/02
See application file for complete search history.

(56) References Cited

U.S. PATENT DOCUMENTS

| | | |
|---|---|---|
| 2004/0006178 A1 | 1/2004 | Nagahara et al. |
| 2005/0113505 A1 | 5/2005 | Watanabe et al. |
| 2009/0215960 A1 | 8/2009 | Jin et al. |
| 2017/0183455 A1 | 6/2017 | Yoo et al. |
| 2019/0023894 A1 | 1/2019 | Han et al. |
| 2019/0177522 A1 | 6/2019 | Kim et al. |
| 2020/0165440 A1 | 5/2020 | Kim et al. |
| 2020/0216579 A1 | 7/2020 | Chai et al. |
| 2020/0339799 A1 | 10/2020 | Kim et al. |
| 2020/0407478 A1 | 12/2020 | Chai et al. |

FOREIGN PATENT DOCUMENTS

| | | | |
|---|---|---|---|
| CN | 1727375 A | 2/2006 | |
| CN | 108473637 A | 8/2018 | |
| CN | 110964133 A | 4/2020 | |
| CN | 111278914 A | 6/2020 | |
| CN | 111386290 A | 7/2020 | |
| EP | 3 623 397 A1 | 3/2020 | |
| JP | H09-059325 A | 3/1997 | |
| JP | 4281531 B2 | 6/2009 | |
| JP | 2019-52283 A | 4/2019 | |
| KR | 10-2002-0004504 A | 1/2002 | |
| KR | 10-2003-0056087 A | 7/2003 | |
| KR | 10-2005-0043402 A | 5/2005 | |
| KR | 10-0497406 B1 | 6/2005 | |
| KR | 10-0516505 B1 | 9/2005 | |
| KR | 10-0716563 B1 | 5/2007 | |
| KR | 10-2007-0062682 A | 6/2007 | |
| KR | 10-0834423 B1 | 6/2008 | |
| KR | 10-2016-0032668 A | 3/2016 | |
| KR | 10-2018-0066811 A | 6/2018 | |
| KR | 10-2039031 B1 | 11/2019 | |
| KR | 10-2020-0073612 A | 6/2020 | |
| KR | 20200077958 A * | 7/2020 | ............ C08F 212/10 |
| WO | 2019/151776 A1 | 8/2019 | |
| WO | 2019/221399 A1 | 11/2019 | |

OTHER PUBLICATIONS

Extended European Search Report issued in corresponding EP Patent Application No. 21836797.7 dated Jan. 2, 2023.
Office Action issued Sep. 25, 2023 for corresponding Chinese Patent Application No. 202180005874.4.
Office Action issued Dec. 8, 2023 for corresponding Korean Patent Application No. 10-2021-0087924.
International Search Report (with partial English translation) and Written Opinion issued in corresponding International Patent Application No. PCT/KR2021/008557 dated Oct. 21, 2021.

* cited by examiner

*Primary Examiner* — Mark S Kaucher
(74) *Attorney, Agent, or Firm* — Morgan, Lewis & Bockius LLP

(57) ABSTRACT

Provided are a method of preparing a graft copolymer and a graft copolymer, the method including: batch-adding a first molecular weight controlling agent, a diene-based rubber polymer, an aromatic vinyl-based monomer, and a vinyl cyanide-based monomer to a reactor to initiate polymerization; and after the initiation of polymerization, continuously adding a second molecular weight controlling agent, an aromatic vinyl-based monomer, and a vinyl cyanide-based monomer to the reactor to perform polymerization, wherein the second molecular weight controlling agent includes an alkyl styrene-based dimer and a mercaptan-based compound in a weight ratio of 40.0:60.0 to 70.0:30.0, and a weight ratio of the first molecular weight controlling agent and the second molecular weight controlling agent is 5.0:95.0 to 25.0:75.0.

8 Claims, No Drawings

METHOD OF PREPARING GRAFT COPOLYMER AND GRAFT COPOLYMER PREPARED BY THE SAME

CROSS-REFERENCE TO RELATED APPLICATION

This application claims priority to and the benefit of Korean Patent Application No. 10-2020-0084052, filed on Jul. 8, 2020, and Korean Patent Application No. 10-2021-0087924, filed on Jul. 5, 2021, the disclosures of which are incorporated herein by reference in their entirety.

TECHNICAL FIELD

Technical Field

The present invention relates to a method of preparing a graft copolymer and a graft copolymer prepared by the same, and specifically, to a method of preparing a graft copolymer whose surface characteristics, impact resistance, and processability are all excellent and a graft copolymer prepared by the same.

Background Art

A diene-based graft copolymer prepared by graft polymerization of monomers, such as a (meth)acrylate-based monomer, an aromatic vinyl-based monomer, a vinyl cyanide-based monomer, and the like, onto a diene-based rubber polymer has been widely used as an impact modifier for a thermoplastic resin composition due to the excellent rubber characteristics of the diene-based rubber polymer. Also, a thermoplastic resin composition including the diene-based graft copolymer has been widely used in office equipment, electrical/electronic parts, automotive interior materials, and the like because the impact resistance, chemical resistance, and processability thereof are excellent.

In order to improve the impact resistance, processability, and surface characteristics of the diene-based graft copolymer, many studies have been conducted. However, when the weight-average molecular weight or degree of grafting of the diene-based graft copolymer is increased to improve the impact resistance of the diene-based graft copolymer, processability and surface characteristics are degraded. Also, when the degree of grafting of the diene-based graft copolymer is decreased to improve the processability and surface characteristics of the diene-based graft copolymer, impact resistance is rather degraded.

Accordingly, research to prepare a diene-based graft copolymer whose impact resistance, processability, and surface characteristics are all excellent while maintaining the weight-average molecular weight and degree of grafting of the diene-based graft copolymer is continuing.

RELATED-ART DOCUMENTS

Patent Documents (Patent Document 1) KR2039031B

DISCLOSURE

Technical Problem

The present invention is directed to providing a graft copolymer whose surface characteristics, impact resistance, and processability are all excellent.

Technical Solution

One aspect of the present invention provides a method of preparing a graft copolymer, which includes: batch-adding a first molecular weight controlling agent, a diene-based rubber polymer, an aromatic vinyl-based monomer, and a vinyl cyanide-based monomer to a reactor to initiate polymerization; and after the initiation of polymerization, continuously adding a second molecular weight controlling agent, an aromatic vinyl-based monomer, and a vinyl cyanide-based monomer to the reactor to perform polymerization, wherein the second molecular weight controlling agent includes an alkyl styrene-based dimer and a mercaptan-based compound in a weight ratio of 40.0:60.0 to 70.0:30.0, and a weight ratio of the first molecular weight controlling agent and the second molecular weight controlling agent is 5.0:95.0 to 25.0:75.0.

Another aspect of the present invention provides a graft copolymer which includes a diene-based rubber polymer, onto which an aromatic vinyl-based monomer unit and a vinyl cyanide-based monomer unit are grafted, and has a weight-average molecular weight of 70,000 to 80,000 g/mol or less, a degree of grafting of 32 to 40%, and a molecular weight distribution of 2.0 or less.

Still another aspect of the present invention provides a thermoplastic resin composition including the graft copolymer.

Advantageous Effects

According to a method of preparing a graft copolymer of the present invention, a molecular weight distribution can be lowered while maintaining the degree of grafting and weight-average molecular weight of a graft copolymer at appropriate levels. Accordingly, a graft copolymer whose surface characteristics, impact resistance, and processability are excellent can be prepared.

Modes of the Invention

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

As used herein, the term "diene-based rubber polymer" may mean a synthetic rubber prepared by polymerization of a diene-based monomer or crosslinking of a diene-based monomer and an aromatic vinyl-based monomer.

The diene-based monomer may be one or more selected from the group consisting of 1,3-butadiene, isoprene, chloroprene, and piperylene, with 1,3-butadiene being preferred.

The diene-based rubber polymer may have an average particle diameter of 50 to 500 nm, and preferably, 70 to 400 nm. When the above-described condition is satisfied, a graft copolymer whose impact resistance and surface characteristics are excellent can be prepared.

As used herein, the term "aromatic vinyl-based monomer" may mean one or more selected from the group consisting of styrene, α-methyl styrene, p-methyl styrene, 2,4-dimethyl styrene, 4-fluorostyrene, 4-chlorostyrene, 2-chlorostyrene, 4-bromostyrene, and 2-bromostyrene. As the aromatic vinyl-based monomer, styrene is preferred.

As used herein, the term "vinyl cyanide-based monomer" may mean one or more selected from the group consisting of acrylonitrile, 2-methyl acrylonitrile, 2-ethyl acrylonitrile, and 2-chloroacrylonitrile. As the vinyl cyanide-based monomer, acrylonitrile is preferred.

As used herein, the term "alkyl styrene-based dimer" may mean one or more selected from the group consisting of an α-methyl styrene dimer, a p-methyl styrene dimer, and a 2,4-dimethyl styrene dimer. As the alkyl styrene-based dimer, an α-methyl styrene dimer is preferred.

As used herein, the term "mercaptan-based compound" may mean one or more selected from the group consisting of t-dodecyl mercaptan, n-dodecyl mercaptan, and n-octyl mercaptan. As the mercaptan-based compound, t-dodecyl mercaptan is preferred.

As used herein, the term "polymerization conversion rate" may mean a polymerization conversion rate calculated by the following equation.

Polymerization conversion rate (%)={(Total weight of monomers added until polymerization is completed)−(Total weight of monomers unreacted until polymerization is completed)}/(Total weight of monomers added until polymerization is completed)×100

As used herein, the term "degree of grafting" may be calculated by the following Equation 1 after 1 g of graft copolymer powder is dissolved in 50 ml of acetone while stirring for 24 hours, centrifugation is performed to separate a supernatant and a precipitate, the precipitate is dried in a hot air dryer set at 50° C. for 12 hours, and then the obtained dry solid is weighed:

Degree of grafting (%)={(Weight of copolymer of grafted monomer mixture$^{1)}$)/(Weight of diene-based rubber polymer$^{2)}$)}×100   [Equation 1]

1) Weight of copolymer of grafted monomer mixture= (Weight of dry solid)−(Weight of diene-based rubber polymer)
2) Weight of diene-based rubber polymer=Weight (based on solid content) of theoretically added diene-based rubber polymer or Weight of diene-based rubber polymer as measured by analyzing a graft copolymer through infrared spectroscopy As used herein, the term "weight-average molecular weight of a graft copolymer" may be measured as a relative value with respect to a standard polystyrene (PS) sample by gel permeation chromatography (GPC) after the dry solid obtained by drying the supernatant as described in the measurement method of the degree of grafting is dissolved in a tetrahydrofuran (THF) solution and then filtered through a 1-μm filter.

As used herein, the term "molecular weight distribution" may mean a ratio of the weight-average molecular weight of a graft copolymer to the number-average molecular weight of a graft copolymer. The number-average molecular weight of a graft copolymer may be measured as described in the measurement method of the weight-average molecular weight of a graft copolymer.

As used herein, the term "polymerization" may mean one or more selected from the group consisting of suspension polymerization, emulsion polymerization, and bulk polymerization. Among them, emulsion polymerization, which enables the preparation of a graft copolymer whose surface characteristics and impact resistance are both excellent, is preferred.

As used herein, the "sum of the diene-based rubber polymer, aromatic vinyl-based monomer, and vinyl cyanide-based monomer" may mean the sum of the diene-based rubber polymer, aromatic vinyl-based monomer, and vinyl cyanide-based monomer which are added in the preparation of a graft copolymer.

As used herein, the term "average particle diameter of a diene-based rubber polymer" may mean an arithmetic average particle diameter in the particle size distribution as measured by a dynamic light scattering method, specifically, an average particle diameter based on a scattering intensity distribution. The average particle diameter of a diene-based rubber polymer may be measured using a Nicomp 380 instrument (manufactured by PSS).

As used herein, the term "average particle diameter of an insoluble content in a turbid liquid" may be a value measured by a light scattering method after a thermoplastic resin composition is dissolved in acetone, stirring is performed, and an insoluble content that has not been dissolved in acetone is centrifuged for sorting according to size. Specifically, the term may be a value measured by a light scattering method after 0.2 g of a sample prepared by extruding and injecting a thermoplastic resin composition is dissolved in 50 ml of acetone, stirring is performed for 20 hours, and an insoluble content that has not been dissolved in acetone is centrifuged using a particle size analyzer (UHR 18000 commercially available from CPS Instruments) for sorting according to size.

1. Method of Preparing Graft Copolymer

A method of preparing a graft copolymer according to one embodiment of the present invention includes: batch-adding a first molecular weight controlling agent, a diene-based rubber polymer, an aromatic vinyl-based monomer, and a vinyl cyanide-based monomer to a reactor to initiate polymerization; and continuously adding a second molecular weight controlling agent, an aromatic vinyl-based monomer, and a vinyl cyanide-based monomer to the reactor to perform polymerization, wherein the second molecular weight controlling agent includes an alkyl styrene-based dimer and a mercaptan-based compound in a weight ratio of 40.0:60.0 to 70.0:30.0, and a weight ratio of the first molecular weight controlling agent and the second molecular weight controlling agent is 5.0:95.0 to 25.0:75.0.

The inventors of the present invention have found that, when continuous addition is performed by adjusting an alkyl styrene-based dimer and a mercaptan-based compound so that they are included in a second molecular weight controlling agent at a specific weight ratio in the performance of polymerization and when a first molecular weight controlling agent and a second molecular weight controlling agent are adjusted to a specific weight ratio, a weight-average molecular weight, a degree of grafting, and a molecular weight distribution are adjusted to appropriate levels, and thus a graft copolymer whose surface characteristics, impact resistance, and processability are all excellent can be prepared, thereby completing the present invention.

Hereinafter, the method of preparing a graft copolymer according to one embodiment of the present invention will be described.

1) Initiation of Polymerization

First, a first molecular weight controlling agent, a diene-based rubber polymer, an aromatic vinyl-based monomer, and a vinyl cyanide-based monomer are batch-added to a reactor to initiate polymerization.

An alkyl styrene-based dimer may lower a molecular weight distribution while maintaining a degree of grafting at an appropriate level compared to a mercaptan-based compound. Therefore, it is preferable that an alkyl styrene-based dimer is used as the first molecular weight controlling agent.

The first molecular weight controlling agent may be added in an amount of 0.01 to 0.15 parts by weight, and preferably, 0.03 to 0.08 parts by weight with respect to 100 parts by weight of the sum of the diene-based rubber polymer, aromatic vinyl-based monomer, and vinyl cyanide-based monomer. When the above-described range is satisfied, the molecular weight distribution of a graft copolymer can be lowered while maintaining the degree of grafting and weight-average molecular weight thereof at appropriate levels, and thus the impact resistance of a graft copolymer can be improved.

The polymerization may be initiated in the presence of one or more selected from the group consisting of an emulsifier, an initiator, an activator, and an aqueous solvent.

The initiator is a radical initiator, and the radical initiator may be one or more selected from the group consisting of sodium persulfate, potassium persulfate, ammonium persulfate, hydroperoxide, t-butyl peroxide, t-butyl hydroperoxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethyl hexanol peroxide, t-butyl peroxy isobutyrate, azobisisobutyronitrile, azobis-2,4-dimethylvaleronitrile, azobis cyclohexane carbonitrile, and azobis methyl isobutyrate, with hydroperoxide being preferred.

The initiator may be present in an amount of 0.001 to 1.000 parts by weight, and preferably, 0.010 to 0.800 parts by weight with respect to 100 parts by weight of the sum of the diene-based rubber polymer, vinyl cyanide-based monomer, and aromatic vinyl-based monomer. When the above-described range is satisfied, graft polymerization stability can be improved, and the amount of initiator remaining in graft copolymer powder can also be minimized.

In addition to the initiator, an activator may be further added to promote the initiation of polymerization. The activator may be one or more selected from the group consisting of sodium formaldehyde sulfoxylate, sodium ethylenediamine tetraacetate, ferrous sulfate (II), dextrose, tetrasodium pyrophosphate, anhydrous sodium pyrophosphate, and sodium sulfate, with one or more selected from the group consisting of tetrasodium pyrophosphate, ferrous sulfate (II), and sodium aldehyde sulfoxylate being preferred.

The activator may be added in an amount of 0.001 to 0.500 parts by weight, and preferably, 0.010 to 0.300 parts by weight with respect to 100 parts by weight of the sum of the diene-based rubber polymer, vinyl cyanide-based monomer, and aromatic vinyl-based monomer. When the above-described range is satisfied, graft polymerization stability can be improved, and the amount of activator remaining in graft copolymer powder can also be minimized.

The emulsifier may be one or more selected from the group consisting of sodium dicyclohexyl sulfosuccinate, sodium dodecyl sulfate, sodium dodecyl benzene sulfonate, sodium octadecyl sulfate, sodium oleic sulfate, potassium dodecyl sulfate, potassium octadecyl sulfate, potassium rosinate, and sodium rosinate.

The emulsifier may be added in an amount of 0.15 to 2.00 parts by weight, and preferably, 0.30 to 1.50 parts by weight with respect to 100 parts by weight of the sum of the diene-based rubber polymer, vinyl cyanide-based monomer, and aromatic vinyl-based monomer. When the above-described range is satisfied, graft polymerization stability can be improved, and graft copolymer powder with a desired average particle diameter can be prepared.

The aqueous solvent may be ion exchanged water or pure water.

2) Performance of Polymerization

Next, a second molecular weight controlling agent, an aromatic vinyl-based monomer, and a vinyl cyanide-based monomer are continuously added to the reactor to perform polymerization.

In this case, the second molecular weight controlling agent may include an alkyl styrene-based dimer and a mercaptan-based compound in a weight ratio of 40.0:60.0 to 70.0:30.0, and preferably, in a weight ratio of 41:59 to 65:35. When the above-described condition is satisfied, the molecular weight distribution and glass transition temperature of a graft copolymer are lowered, and thus a graft copolymer whose surface characteristics, impact resistance, and processability are all excellent can be prepared. Below the above-described range, the weight-average molecular weight and molecular weight distribution of a graft copolymer are increased, and thus the surface characteristics and processability of a graft copolymer may be degraded. On the other hand, above the above-described range, the polymerization conversion rate of a graft copolymer is lowered, and thus preparation efficiency may be degraded. Also, the degree of grafting of a graft copolymer is lowered, and thus the surface characteristics and impact resistance of a graft copolymer may be degraded.

The second molecular weight controlling agent may be added in an amount of 0.2 to 0.7 parts by weight, and preferably, 0.3 to 0.6 parts by weight with respect to 100 parts by weight of the sum of the diene-based rubber polymer, aromatic vinyl-based monomer, and vinyl cyanide-based monomer. When the above-described condition is satisfied, the glass transition temperature and particle dispersity of a graft copolymer are lowered, and thus the impact resistance and surface characteristics of a graft copolymer can be improved.

A weight ratio of the first molecular weight controlling agent and the second molecular weight controlling agent may be 5.0:95.0 to 25.0:75.0, and preferably, 8.0:92.0 to 22.0:78.0. When the above-described condition is satisfied, the impact resistance and processability of a graft copolymer can be improved. Below or above the above-described condition, the final polymerization conversion rate of a graft copolymer may be lowered, and the degree of grafting, weight-average molecular weight, impact resistance, and surface characteristics of a graft copolymer may be substantially degraded.

Meanwhile, when a weight ratio of the alkyl styrene-based dimer and mercaptan-based compound in the second molecular weight controlling agent satisfies the above-described weight ratio, and the first and second molecular weight controlling agents do not satisfy the above-described weight ratio, the final polymerization conversion rate, degree of grafting, weight-average molecular weight, impact resistance, and surface characteristics of a graft copolymer may be substantially degraded. Also, when the first and second molecular weight controlling agents satisfy the above-described weight ratio, and a weight ratio of the alkyl styrene-based dimer and mercaptan-based compound in the second molecular weight controlling agent does not satisfy the above-described weight ratio, the surface characteristics of a graft copolymer may be substantially degraded. Also, when both a weight ratio of the alkyl styrene-based dimer and mercaptan-based compound in the second molecular weight controlling agent and a weight ratio of the first and second molecular weight controlling agents are not satisfied, all of the polymerization conversion rate, degree of grafting, weight-average molecular weight, impact resistance, and surface characteristics of a graft copolymer may be substantially degraded.

When the second molecular weight controlling agent is continuously added, a degree of grafting and a weight-average molecular weight are easily adjusted compared to when it is batch-added, and thus a graft copolymer having a desired degree of grafting and a desired weight-average molecular weight may be prepared.

The continuous addition of the second molecular weight controlling agent is initiated when a polymerization conversion rate reaches 10% or less, and preferably, 1 to 5%. When the above-described condition is satisfied, the second molecular weight controlling agent is added after the beginning of polymerization, and thus an effect caused by the second molecular weight controlling agent can be maximized.

The time when the continuous addition of the second molecular weight controlling agent is terminated may be a time when a polymerization conversion rate reaches 80 to 97%, and preferably, 90 to 95%. When the above-described condition is satisfied, polymerization stability can be improved, and a polymerization conversion rate can be increased.

A weight ratio of the aromatic vinyl-based monomer added in the initiation of polymerization and the aromatic vinyl-based monomer added in the performance of polymerization may be 10.0:90.0 to 35.0:65.0, and preferably, 15.0:85.0 to 30.0:70.0. When the above-described condition is satisfied, polymerization stability can be improved, and a graft copolymer with a uniform composition throughout polymerization can be prepared.

A weight ratio of the vinyl cyanide-based monomer added in the initiation of polymerization and the vinyl cyanide-based monomer added in the performance of polymerization may be 10.0:90.0 to 35.0:65.0, and preferably, 15.0:85.0 to 30.0:70.0. When the above-described condition is satisfied, polymerization stability can be improved, and a graft copolymer with a uniform composition throughout polymerization can be prepared.

The polymerization may be performed in the presence of one or more selected from the group consisting of an emulsifier, an initiator, an activator, and an aqueous solvent. The descriptions of the emulsifier, initiator, activator, and aqueous solvent have been described above.

2. Graft Copolymer

A graft copolymer according to another embodiment of the present invention includes a diene-based rubber polymer, onto which an aromatic vinyl-based monomer unit and a vinyl cyanide-based monomer unit are grafted, and has a weight-average molecular weight of 70,000 to 80,000 g/mol or less, a degree of grafting of 32 to 40%, and a molecular weight distribution of 2.0 or less.

Preferably, the graft copolymer has a weight-average molecular weight of 72,000 to 80,000 g/mol, a degree of grafting of 32 to 39%, and a molecular weight distribution of 1.7 or less. More preferably the graft copolymer has a weight-average molecular weight of 75,000 to 80,000 g/mol, a degree of grafting of 35 to 39%, and a molecular weight distribution of 1.6 or less. When the above-described condition is satisfied, all of the impact resistance, surface characteristics, and processability of a graft copolymer can be excellent.

Meanwhile, the graft copolymer may have a glass transition temperature of −100 to −90° C., and preferably, −95 to −90° C. When the above-described condition is satisfied, the impact resistance of a graft copolymer can be improved.

The graft copolymer may include a copolymer including an aromatic vinyl-based monomer unit and a vinyl cyanide-based monomer unit which are not grafted onto a diene-based rubber polymer.

The graft copolymer may be a graft copolymer prepared by the method of preparing a graft copolymer according to one embodiment of the present invention.

3. Thermoplastic Resin Composition

A thermoplastic resin composition according to still another embodiment of the present invention includes the graft copolymer according to another embodiment of the present invention.

The thermoplastic resin composition may further include a non-grafted copolymer including an aromatic vinyl-based monomer unit and a vinyl cyanide-based monomer unit to improve processability.

The thermoplastic resin composition may include the graft copolymer and the non-grafted copolymer in a weight ratio of 10:90 to 40:60, and preferably, 20:80 to 30:70. When the above-described range is satisfied, a thermoplastic resin composition whose processability and impact resistance are excellent can be prepared.

The non-grafted copolymer may include an aromatic vinyl-based monomer unit and a vinyl cyanide-based monomer unit in a weight ratio of 60.0:40.0 to 80.0:20.0, and preferably, 65.0:35.0 to 75.0:25.0. When the above-described condition is satisfied, a thermoplastic resin composition whose processability and chemical resistance are excellent can be prepared.

The non-grafted copolymer is preferably a styrene/acrylonitrile non-grafted copolymer.

The thermoplastic resin composition may have a particle dispersity of 5 or less, and preferably, 2 to 4 as calculated by the following Equation 1:

$$\text{Particle dispersity (Np)} = \frac{(\text{Average particle diameter of insoluble content in turbid liquid})^3}{(\text{Average particle diameter of diene-based rubber polymer})^3} \quad [\text{Equation 1}]$$

In Equation 1, the average particle diameter of an insoluble content in a turbid liquid is a value measured by a light scattering method after a thermoplastic resin composition is dissolved in acetone, stirring is performed, and an insoluble content that has not been dissolved in acetone is centrifuged for sorting according to size, and the average particle diameter of a diene-based rubber polymer is a value determined by measuring a diene-based rubber polymer added in polymerization by a dynamic light scattering method.

The particle dispersity is an index that indicates the degree of dispersion of a graft copolymer in a non-grafted copolymer (matrix copolymer) in a thermoplastic resin composition, and a lower value indicates better dispersity of a graft copolymer. When the above-described value is satisfied, a molded article having excellent surface characteristics can be prepared.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

EXAMPLE 1

<Graft Copolymer>

A first mixed solution containing 100.0 parts by weight of ion exchanged water, 58.0 parts by weight (based on solid content) of a butadiene rubber polymer latex (average particle diameter: 300 nm), 7.5 parts by weight of styrene, 2.5 parts by weight of acrylonitrile, 0.10 parts by weight of potassium oleate, 0.050 parts by weight of tetrabutyl hydroperoxide, 0.080 parts by weight of dextrose, 0.050 parts by weight of tetrasodium pyrophosphate, 0.001 parts by weight of ferrous sulfate (II), and a first molecular weight controlling agent in an amount shown in Table 1 below was prepared.

In addition, a second mixed solution containing 12.0 parts by weight of ion exchanged water, 24.0 parts by weight of styrene, 8.0 parts by weight of acrylonitrile, 0.20 parts by weight of potassium oleate, 0.10 parts by weight of tetrabutyl hydroperoxide, and a second molecular weight controlling agent in an amount shown in Table 1 below was prepared.

Additionally, a third mixed solution containing 0.040 parts by weight of dextrose, 0.030 parts by weight of tetrasodium pyrophosphate, and 0.0005 parts by weight of ferrous sulfate (II) was prepared.

The first mixed solution was batch-added to a nitrogen-filled polymerization reactor, and then polymerization was initiated at 50° C. The temperature of the polymerization reactor was raised to 70° C., and polymerization was performed for 2 hours while continuously adding the second mixed solution so that a polymerization conversion rate reached 92%. Subsequently, the third mixed solution was batch-added to the polymerization reactor, the temperature was raised to 80° C. for an hour, and polymerization was terminated to obtain a graft copolymer latex. 0.4 parts by weight of an antioxidant (OW500 commercially available from LATON) was added to the graft copolymer latex, and the resultant was coagulated with 2.0 parts by weight of sulfuric acid. Afterward, dehydration and drying with hot air were performed to prepare graft copolymer powder with a moisture content of less than 1 wt %.

<Preparation of Thermoplastic Resin Composition>

30 parts by weight of the prepared graft copolymer powder and 70 parts by weight of a styrene/acrylonitrile non-grafted copolymer (92HR commercially available from LG Chem.) were homogeneously mixed to prepare a thermoplastic resin composition.

EXAMPLES 2 TO 7 AND COMPARATIVE EXAMPLES 1 TO 10

Graft polymer powder and thermoplastic resin compositions were prepared in the same manner as in Example 1, except that a first molecular weight controlling agent and a second molecular weight controlling agent were added in amounts shown in Tables 1 to 5 below.

EXPERIMENTAL EXAMPLE 1

The physical properties of the graft copolymer latex or powder according to Examples and Comparative Examples were measured by methods shown below, and results thereof are shown in Tables 1 to 5 below.

(1) Polymerization conversion rate (%): calculated by the following equation.

Polymerization conversion rate (%)={(Total weight of monomers added until polymerization is completed)−(Total weight of monomers unreacted until polymerization is completed)}/(Total weight of monomers added until polymerization is completed)×100

(2) Degree of grafting (%): calculated by the following Equation 1 after 1 g of the graft copolymer powder was dissolved in 50 ml of acetone while stirring for 24 hours, centrifugation was performed to separate a supernatant and a precipitate, the precipitate was dried in a hot air dryer set at 50° C. for 12 hours, and then the obtained dry solid was weighed:

Degree of grafting (%)={(Weight of copolymer of grafted monomer mixture[1])/(Weight of diene-based rubber polymer[2])}×100  [Equation 1]

1) Weight of copolymer of grafted monomer mixture= (Weight of dry solid)−(Weight of diene-based rubber polymer)

2) Weight of diene-based rubber polymer=Weight (based on solid content) of theoretically added diene-based rubber polymer or Weight of diene-based rubber polymer as measured by analyzing a first copolymer through infrared spectroscopy (3) Weight-average molecular weight (g/mol): measured as a relative value with respect to a standard polystyrene (PS) sample by gel permeation chromatography (GPC) after the dry solid obtained by drying the supernatant as described in the measurement method of the degree of grafting was dissolved in a tetrahydrofuran (THF) solution and then filtered through a 1-μm filter.

(4) Molecular weight distribution: it means a ratio (Mw/Mn) of a weight-average molecular weight (Mw) to a number-average molecular weight (Mn). The number-average molecular weight of the graft copolymer was also measured as described in the measurement method of the weight-average molecular weight of the graft copolymer.

(5) Glass transition temperature (° C.): measured using a dynamic mechanical analyzer (DMA) after the graft copolymer powder was compressed using a press at 200° C.

EXPERIMENTAL EXAMPLE 2

The thermoplastic resin compositions according to Examples and Comparative Examples were extruded and injected to prepare samples, the physical properties of the samples were measured by methods shown below, and results thereof are shown in Tables 1 to 5 below.

(1) Particle dispersity (Np): calculated by the following equation.

Particle dispersity is an index that indicates the degree of dispersion of the graft copolymer in the non-grafted copolymer in the thermoplastic resin composition, and a lower value indicates better dispersity of the graft copolymer.

Particle dispersity (Np)=(Average particle diameter of insoluble content in turbid liquid)$^3$/(Average particle diameter of diene-based rubber polymer)$^3$ The average particle diameter of an insoluble content in a turbid liquid was measured by a light scattering method after 0.2 g of the sample was dissolved in 50 ml of acetone, slow stirring was performed for 20 hours, and an insoluble content that had not been dissolved in acetone was centrifuged using a particle size analyzer (UHR 18000 commercially available from CPS Instruments) for sorting according to size.

The average particle diameter of the diene-based rubber polymer was determined by measuring a diene-based rubber polymer added in polymerization using a Nicomp 380 instrument (manufactured by PSS) by a dynamic light scattering method.

(2) Melt flow index (g/10 min): measured in accordance with ASTM D1238 under conditions of 220° C. and 10 kg.

(3) IZOD impact strength (kg·cm/cm, ¼ inch): measured in accordance with ASTM D265.

(4) Surface protrusion (number): Among protrusions present in 1 m² of the sample, only protrusions with a size of 50 μm or more were counted.

TABLE 1

| Classification | | Example 1 | Example 2 | Example 3 | Example 4 |
|---|---|---|---|---|---|
| First molecular weight controlling agent | AMSD | 0.05 | 0.05 | 0.05 | 0.05 |
| Second molecular weight controlling agent | AMSD | 0.14 | 0.15 | 0.35 | 0.45 |
| | TDDM | 0.20 | 0.20 | 0.20 | 0.20 |
| | AMSD:TDDM (weight ratio) | about 41.2:58.8 | about 42.9:57.1 | about 63.6:36.4 | about 69.2:30.8 |
| Weight ratio of first and second molecular weight controlling agents | | about 12.8:87.2 | about 12.5:87.5 | about 8.3:91.7 | about 7.1:92.9 |
| Graft copolymer | Polymerization conversion rate | 97.3 | 97.8 | 97.7 | 95.2 |
| | Degree of grafting | 39 | 38 | 37 | 33 |
| | Weight-average molecular weight | 78,000 | 77,000 | 75,000 | 73,000 |
| | Molecular weight distribution | 1.6 | 1.5 | 1.5 | 1.7 |
| | Glass transition temperature | −90 | −90 | −93 | −95 |
| Thermoplastic resin composition | Melt flow index | 21 | 21 | 22 | 23 |
| | Particle dispersity | 3.9 | 3.8 | 2.7 | 2.5 |
| | IZOD impact strength | 32 | 33 | 33 | 31 |
| | Surface protrusion | 1,350 | 1,300 | 1,100 | 1,000 |

AMSD: α-methyl styrene dimer
TDDM: t-dodecyl mercaptan

TABLE 2

| Classification | | Example 5 | Example 6 | Example 7 |
|---|---|---|---|---|
| First molecular weight controlling agent | AMSD | 0.10 | 0.10 | 0.04 |
| Second molecular weight controlling agent | AMSD | 0.15 | 0.30 | 0.35 |
| | TDDM | 0.20 | 0.20 | 0.40 |
| | AMSD:TDDM (weight ratio) | 42.9:57.1 | 60.0:40.0 | about 46.7:53.3 |
| Weight ratio of first and second molecular weight controlling agents | | about 22.2:77.8 | about 16.7:83.3 | about 5.1:94.9 |
| Graft copolymer | Polymerization conversion rate | 97.7 | 97.6 | 97.2 |
| | Degree of grafting | 37 | 36 | 32 |
| | Weight-average molecular weight | 76,000 | 74,000 | 72,000 |
| | Molecular weight distribution | 1.5 | 1.3 | 1.5 |
| | Glass transition temperature | −91 | −94 | −93 |
| Thermoplastic resin composition | Melt flow index | 22 | 23 | 24 |
| | Particle dispersity | 3.5 | 2.5 | 2.2 |
| | IZOD impact strength | 33 | 33 | 32 |
| | Surface protrusion | 1,200 | 1,000 | 1,000 |

AMSD: α-methyl styrene dimer
TDDM: t-dodecyl mercaptan

TABLE 3

| Classification | | Comparative Example 1 | Comparative Example 2 | Comparative Example 3 | Comparative Example 4 |
|---|---|---|---|---|---|
| First molecular weight controlling agent | AMSD | 0 | 0 | 0 | 0 |
| Second molecular weight controlling agent | AMSD | 0.40 | 0 | 0 | 0 |
| | TDDM | 0.20 | 0.10 | 0.20 | 0.30 |
| | AMSD:TDDM (weight ratio) | about 66.7:33.3 | — | — | — |
| Weight ratio of first and second molecular weight controlling agents | | — | — | — | — |
| Graft copolymer | Polymerization conversion rate | 97.7 | 98.2 | 97.8 | 97.5 |
| | Degree of grafting | 38 | 48 | 40 | 35 |
| | Weight-average molecular weight | 77,000 | 93,000 | 81,000 | 68,000 |
| | Molecular weight distribution | 2.1 | 2.1 | 2.2 | 2.3 |
| | Glass transition temperature | −90 | −87 | −87 | −87 |

TABLE 3-continued

| | Classification | Comparative Example 1 | Comparative Example 2 | Comparative Example 3 | Comparative Example 4 |
|---|---|---|---|---|---|
| Thermoplastic resin composition | Melt flow index | 21 | 17 | 20 | 21 |
| | Particle dispersity | 10 | 37 | 18 | 16 |
| | IZOD impact strength | 31 | 32 | 32 | 27 |
| | Surface protrusion | 1,700 | 8,500 | 4,700 | 4,000 |

AMSD: α-methyl styrene dimer
TDDM: t-dodecyl mercaptan

TABLE 4

| | Classification | Comparative Example 5 | Comparative Example 6 | Comparative Example 7 | Comparative Example 8 |
|---|---|---|---|---|---|
| First molecular weight controlling agent | AMSD | 0.05 | 0.05 | 0.03 | 0.03 |
| Second molecular weight controlling agent | AMSD | 0.12 | 0.60 | 0.60 | 0.12 |
| | TDDM | 0.20 | 0.20 | 0.45 | 0.40 |
| | AMSD:TDDM (weight ratio) | 37.5:62.5 | 75.0:25.0 | about 57.1:42.9 | about 23.1:76.9 |
| Weight ratio of first and second molecular weight controlling agents | | about 13.5:86.5 | about 5.9:94.1 | about 2.8:97.2 | about 5.5:94.5 |
| Graft copolymer | Polymerization conversion rate | 97.6 | 93.1 | 92.5 | 97.3 |
| | Degree of grafting | 38 | 31 | 28 | 37 |
| | Weight-average molecular weight | 81,000 | 72,000 | 65,000 | 79,000 |
| | Molecular weight distribution | 2.2 | 1.8 | 1.8 | 2.2 |
| | Glass transition temperature | −85 | −87 | −87 | −84 |
| Thermoplastic resin composition | Melt flow index | 19 | 22 | 24 | 20 |
| | Particle dispersity | 25 | 20 | 17 | 17 |
| | IZOD impact strength | 30 | 27 | 22 | 29 |
| | Surface protrusion | 6,200 | 5,000 | 4,300 | 4,200 |

AMSD: α-methyl styrene dimer
TDDM: t-dodecyl mercaptan

TABLE 5

| | Classification | Comparative Example 9 | Comparative Example 10 |
|---|---|---|---|
| First molecular weight controlling agent | AMSD | 0.34 | 0.30 |
| Second molecular weight controlling agent | AMSD | 0.20 | 0.40 |
| | TDDM | 0.60 | 0.40 |
| | AMSD:TDDM (weight ratio) | about 25.0:75.0 | 50.0:50.0 |
| Weight ratio of first and second molecular weight controlling agents | | about 29.8:70.2 | about 27.3:72.7 |
| Graft copolymer | Polymerization conversion rate | 94.7 | 93.0 |
| | Degree of grafting | 29 | 30 |
| | Weight-average molecular weight | 67,000 | 68,000 |
| | Molecular weight distribution | 2.0 | 2.0 |
| | Glass transition temperature | −86 | −87 |
| Thermoplastic resin composition | Melt flow index | 23 | 23 |
| | Particle dispersity | 16 | 13 |
| | IZOD impact strength | 23 | 24 |
| | Surface protrusion | 4,200 | 4,500 |

AMSD: α-methyl styrene dimer
TDDM: t-dodecyl mercaptan

Referring to Tables 1 to 5, the graft copolymers according to Examples 1 to 7, in which an α-methyl styrene dimer and t-dodecyl mercaptan were added in a weight ratio of 40.0:60.0 to 70.0:30.0 as a second molecular weight controlling agent, and a weight ratio of the first molecular weight controlling agent and the second molecular weight controlling agent was 5.0:95.0 to 25.0:75.0, exhibited a weight-average molecular weight of 73,000 to 78,000 g/mol, a degree of grafting of 32 to 39%, a molecular weight distribution of 1.7 or less, and a glass transition temperature of −90 to −95° C. The samples according to Examples 1 to 7, which were prepared using the graft copolymers having the above properties, exhibited excellent processability due to having an appropriate melt flow index and few surface protrusions due to having a low particle dispersity, and thus surface characteristics and impact resistance were also excellent.

However, the graft copolymer according to Comparative Example 1, in which a first molecular weight controlling agent was not added, exhibited a degree of grafting of 38%, a weight-average molecular weight of 77,000 g/mol, a molecular weight distribution of 2.1, and a glass transition temperature of −90° C. Since the graft copolymer according to Comparative Example 1 had a high molecular weight distribution, the sample prepared using the same exhibited many surface protrusions due to having a high particle dispersity, and thus surface characteristics were degraded.

In addition, the graft copolymers according to Comparative Examples 2 and 3, in which a first molecular weight controlling agent was not added, and an α-methyl styrene dimer was not added as a second molecular weight controlling agent, exhibited a high degree of grafting, a high weight-average molecular weight, a high molecular weight distribution, and a high glass transition temperature. Also, the samples according to Comparative Examples 2 and 3, which were prepared using the graft copolymers having the above properties, exhibited many surface protrusions due to having poor particle dispersity, and thus surface characteristics were degraded.

The graft copolymer according to Comparative Example 4, in which a first molecular weight controlling agent was not added, an α-methyl styrene dimer was not added as a second molecular weight controlling agent, and an excessive amount of t-dodecyl mercaptan was added, exhibited a low weight-average molecular weight, a high molecular weight distribution, and a high glass transition temperature. The sample prepared using the graft copolymer having the above properties exhibited many surface protrusions due to having poor particle dispersity, and thus surface characteristics were degraded. Also, impact resistance was degraded.

In addition, the graft copolymer according to Comparative Example 5, in which an α-methyl styrene dimer and t-dodecyl mercaptan were added in a weight ratio of 37.0:63.0 as a second molecular weight controlling agent, exhibited a high weight-average molecular weight, a high molecular weight distribution, and a high glass transition temperature. The sample prepared using the graft copolymer having the above properties exhibited many surface protrusions due to having poor particle dispersity, and thus surface characteristics were degraded.

The graft copolymer according to Comparative Example 6, in which an α-methyl styrene dimer and t-dodecyl mercaptan were added in a weight ratio of 75:25 as a second molecular weight controlling agent, exhibited a low degree of grafting and a low glass transition temperature. The sample prepared using the graft copolymer having the above properties exhibited many surface protrusions due to having poor particle dispersity, and thus surface characteristics were degraded. Also, impact resistance was degraded.

The graft copolymer according to Comparative Example 7, in which a weight ratio of the first and second molecular weight controlling agents was about 2.8:97.2, exhibited a low degree of grafting, a low weight-average molecular weight, and a high glass transition temperature. The sample prepared using the graft copolymer having the above properties exhibited many surface protrusions due to having poor particle dispersity, and thus surface characteristics were degraded. Also, impact resistance was degraded.

The graft copolymer according to Comparative Example 8, in which an α-methyl styrene dimer and t-dodecyl mercaptan were added in a weight ratio of about 23.1:76.9 as a second molecular weight controlling agent, exhibited a high weight-average molecular weight, a high molecular weight distribution, and a high glass transition temperature. The sample prepared using the graft copolymer having the above properties exhibited many surface protrusions due to having poor particle dispersity, and thus surface characteristics were degraded.

The graft copolymer according to Comparative Example 9, in which an α-methyl styrene dimer and t-dodecyl mercaptan were added in a weight ratio of about 25.0:75.0 as a second molecular weight controlling agent, and a weight ratio of the first and second molecular weight controlling agents was about 29.8:70.2, exhibited a low weight-average molecular weight and a high glass transition temperature. The sample prepared using the graft copolymer having the above properties exhibited many surface protrusions due to having poor particle dispersity, and thus surface characteristics were degraded. Also, impact resistance was degraded.

The graft copolymer according to Comparative Example 10, in which an α-methyl styrene dimer and t-dodecyl mercaptan were added in a weight ratio of 50.0:50.0 as a second molecular weight controlling agent, and a weight ratio of the first and second molecular weight controlling agents was about 27.3:72.7, exhibited a low weight-average molecular weight and a high glass transition temperature. The sample prepared using the graft copolymer having the above properties exhibited many surface protrusions due to having poor particle dispersity, and thus surface characteristics were degraded. Also, impact resistance was degraded.

The invention claimed is:

1. A method of preparing a graft copolymer, comprising:
   initiating polymerization including batch-adding a first molecular weight controlling agent, a diene-based rubber polymer, an aromatic vinyl-based monomer, and a vinyl cyanide-based monomer to a reactor to initiate the polymerization; and
   after the initiation of the polymerization, performing the polymerization including continuously adding a second molecular weight controlling agent, the aromatic vinyl-based monomer, and the vinyl cyanide-based monomer to the reactor to perform the polymerization,
   wherein the second molecular weight controlling agent includes an alkyl styrene-based dimer and a mercaptan-based compound in a weight ratio of from 40.0:60.0 to 70.0:30.0, and
   a weight ratio of the first molecular weight controlling agent and the second molecular weight controlling agent is from 5.0:95.0 to 25.0:75.0.

2. The method of claim 1, wherein the second molecular weight controlling agent includes the alkyl styrene-based dimer and the mercaptan-based compound in a weight ratio of from 41.0:59.0 to 65.0:35.0.

3. The method of claim 1, wherein the batch addition includes adding the first molecular weight controlling agent in an amount of from 0.01 to 0.15 parts by weight with respect to 100 parts by weight of a sum of the diene-based rubber polymer, the aromatic vinyl-based monomer, and the vinyl cyanide-based monomer.

4. The method of claim 1, wherein the continuous addition includes adding the second molecular weight controlling agent in an amount of from 0.20 to 0.70 parts by weight with respect to 100 parts by weight of a sum of the diene-based rubber polymer, the aromatic vinyl-based monomer, and the vinyl cyanide-based monomer.

5. The method of claim 1, wherein the first molecular weight controlling agent is an alkyl styrene-based dimer.

6. The method of claim 1, further comprising:
initiating the continuous addition of the second molecular weight controlling agent when a polymerization conversion rate reaches 10% or less, and
terminating the continuous addition of the second molecular weight controlling agent when a polymerization conversion rate reaches from 80 to 97%.

7. The method of claim 1, wherein a weight ratio of the aromatic vinyl-based monomer added in the initiation of the polymerization and the aromatic vinyl-based monomer added in the performance of the polymerization is from 10.0:90.0 to 35.0:65.0.

8. The method of claim 1, wherein a weight ratio of the vinyl cyanide-based monomer added in the initiation of the polymerization and the vinyl cyanide-based monomer added in the performance of the polymerization is from 10.0:90.0 to 35.0:65.0.

* * * * *